March 22, 1960  L. GEBHART  2,929,241
PLANT MOISTURE METER
Filed Aug. 10, 1955
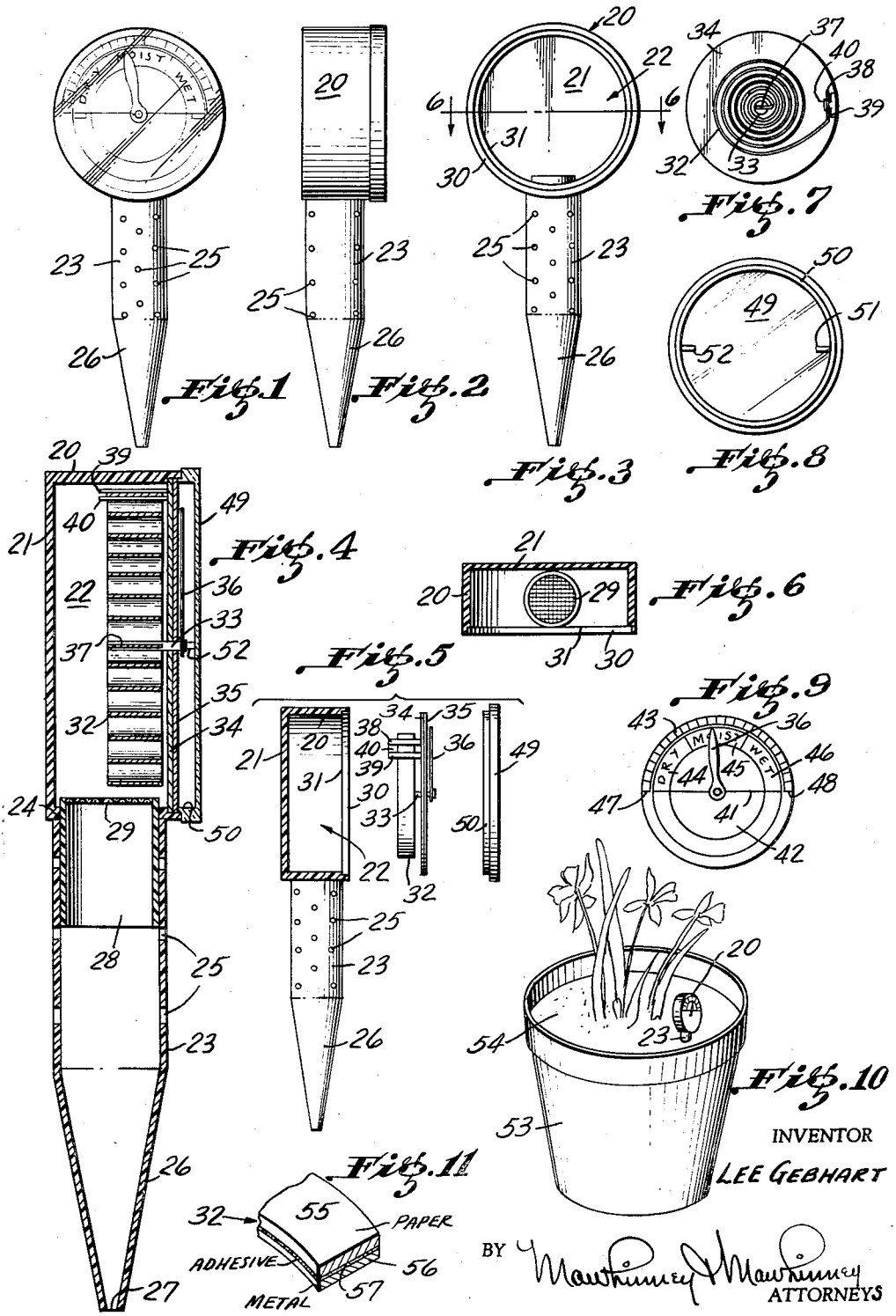
INVENTOR
LEE GEBHART
ATTORNEYS

United States Patent Office 2,929,241
Patented Mar. 22, 1960

2,929,241

PLANT MOISTURE METER

Lee Gebhart, Coral Gables, Fla.

Application August 10, 1955, Serial No. 527,563

4 Claims. (Cl. 73—73)

The present invention relates to a plant moisture meter and has for an object to provide those interested in house plants, or the gardener, with a small, inconspicuous, easily-read and accurate indicator, to enable them to ascertain at a glance the exact moisture condition of soil.

Untold numbers of house plants, and others, are lost annually through lack of proper watering. The great majority of plants, and gardens, either receive too much or too little water. Certain plants require very little moisture, others a great deal. A device according to the invention enables proper measurement of the required levels.

Another object of the invention is to make available a practical, accurate soil moisture indicator marketable at a price level attractive to the householder and gardener.

The invention has for a further object to provide a novel form of hygroscopic coil differing radically from the conventional hygrometer coils presently employed to measure humidity conditions in the surrounding atmosphere, to the end that the coil of this invention may be able to deal with the peculiarities of soil moisture conditions as against atmospheric moisture conditions in a manner to reflect great accuracy in the reading of humidity and moisture conditions obtaining in the soil below earth surface in and about the roots of plants, flowers and the like.

A still further object of the invention is to provide an improved hygroscopic coil so constructed and wound that it will deflect an index connected thereto over a dial at a greater angle of travel per degree of moisture registration whereby greater accuracy is promoted in the readings to be obtained from the dial.

A still further object of the invention is to provide an improved hygroscopic coil of critical dimensions, materials and process of manufacture and treatment whereby the objects mentioned in the immediately preceding paragraph are attained to a high degree.

A still further object of the invention is to provide a plant moisture meter in which the hygroscopic unit comprising the coil, spindle, dial support and pointer all arranged for separate assembly to be mounted as a unit in a case which isolates the instrument from the surrounding atmosphere, such unit being retained in place by a transparent cover for the case which may carry limit stops by which the index is limited to a prescribed angular travel over the scale depicted upon the dial face.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a front elevational view of a plant moisture meter constructed in accordance with the present invention.

Figure 2 is a side elevational view of the same.

Figure 3 is also a front elevational view of the instrument with the hygroscopic unit and cover removed.

Figure 4 is a vertical transverse section taken on an enlarged scale through the instrument.

Figure 5 is an exploded part sectional and part elevational view of the improved moisture meter.

Figure 6 is a transverse section taken on the line 6—6 in Figure 3.

Figure 7 is a rear elevational view of the hygroscopic unit showing the coil, spindle and supporting disc.

Figure 8 is an elevational view of the transparent cover taken from the inner side thereof.

Figure 9 is a front elevational view of the dial and a preferred form of scale inscribed thereon.

Figure 10 is an isometric view of a flower pot showing one mode of use of the improved plant moisture meter.

Figure 11 is a fragmentary sectional view of a form of hygroscopic coil employed.

Referring more particularly to the drawings, 20 designates the cylindrical wall or shell of a casing and 21 the back wall thereof. These walls 20 and 21 are imperforate and may be made of suitable material, preferably plastic. These walls 20 and 21 house an internal chamber 22 which is open at its front portion for introducing and removing the hygroscopic unit.

Extending downwardly from the casing 20, 21 is a hollow stem 23, the interior of which communicates with the internal chamber 22 of the casing through an opening 24. The hollow stem 23 is provided with perforations 25. Below the perforated section is a tapered lower free end 26 which is preferably imperforate except for an end aperture 27.

The hollow stem 23 is united with the casing 20, 21 in any suitable manner, as by being molded therewith, where the parts are made of plastic, or welded thereto as by the use of a solvent, for instance acetone.

Removably mounted in the upper portion of the hollow stem 23 is a screen thimble 28 carrying at its upper end a foraminous or reticulated diaphragm 29 which constitutes the screen element.

At the front portion of the casing is a lip 30 of enlarged diameter having an inwardly-offset shoulder 31 for receiving the support for the hygrometer unit. This unit consists of the hygroscopic coil 32, the spindle 33, support disc 34, dial disc 35 and pointer or index 36. The spindle 33 is journaled in the support disc 34, preferably of metal, while the index 36 is made fast to the forward end of the spindle 33 which projects in front of the dial disc 35, preferably of paper, which may be affixed to the support disc 34 in any suitable manner. A slit 37 in the rear portion of the spindle 33 serves to tightly receive the inner end of the coil 32. The outer end of the coil 32 is anchored to a clamp projecting inwardly from an outer portion of the support disc 34. This anchor clamp comprises fingers 38, 39 and 40 of spring or ductile material. Two of the spaced fingers 38, 39 are intended to embrace one side of the coil end while the other finger 40, which is in an intermediate position, clamps against the other side of the coil end.

Referring more particularly to Figure 9, a diametric line 41 is shown to be drawn horizontally across the dial disc 35, dividing the dial into upper and lower spaces, of which the lower space is shown unoccupied to receive a trademark or other suitable text matter. Above the diametric line 41, the upper half circle of the dial disc 35 is calibrated as to its margin with scale markings 43 and within the scale 43 are three segments 44, 45 and 46 designated Dry, Moist and Wet. In a preferred form of the instrument these segments are of an angular distance of 60° each, thus making the total distance from points 47 and 48, 180°.

The point 47 is the zero or origin point on the dial scale and is referred to hereinafter as Zero Dry. The point 48 on the scale which is 180° removed from the point 47 marks the maximum deflection of the indicator 36 and is known hereinafter as Maximum Wet.

As shown to best advantage in Figures 4 and 5, the edges of the dials 34, 35 are received against the shoulder 31 and accommodated in the space 30 concentrically within the lip of this number. The dials 34, 35 do not fully occupy the lip space 30 but they also leave room for the flange 50 of the transparent cover 49 which is also fitted to this lip 30 outside the scale dial 35 by tight friction fit which serves to hold the cover and the hygroscopic unit in place in the case. The cover 49 carries upon its inner side the stop lugs 51 and 52. The lug or pin 51 defines the origin limit at the point 47 of the dial scale while the lug or pin 52 projects inwardly at the maximum wet point 48 of the scale. These limit stop lugs 51, 52 are arranged to project into the path of the pointer or index 36 so as to limit the movement of the same between the points 47 and 48 or in other words, through a deflection travel of 180°. This means that the upper surfaces of these lugs 51, 52 must be substantially on the diametric line 41, that is, level with this line 41, in which case, as illustrated in Figure 8, the bodies of the lugs 51, 52 are located both below this line 41.

Referring more particularly to Figure 10, 53 designates a flower pot of conventional form containing earth 54 into which has been inserted the improved instrument of this invention as illustrating one method of use and application of the same.

Referring more particularly to Figure 11, which illustrates a section of the coil 32, 55 designates a strip of hygroscopic paper having desirable porous properties and characteristics by which absorption of moisture results in elongation of the strip, and 56 designates a reinforcing metal strip to which the paper 55 is bound in any suitable way, preferably by the use of an adhesive 57. Accordingly, the parts 55, 56 provide a laminated coil which is not to be confused with coils used in hygrometers or humidity indicators. The usual hygrometer coil is a comparatively heavy lamination in which the metal element is not less than $2/1000$ thickness while the paper element ranges from 6 to $10/1000$ thickness. The coil of the present invention comprises a metal stock of only approximately $1/1000$ thickness and an absorbent paper stock of only $5/1000$ thickness. A preferred width of coil according to the present invention is 1/8 inch. Ordinary hygrometer coils are generally much wider.

Because of the far heavier construction of hygrometer coils, they are not nearly as sensitive as the present coil. The average hygrometer coil is designed to "travel," to have a "range" of only about 180° on an arm, or curve, as on the face of a dial. This represents zero to 100% relative humidity. Such hygrometer coils have been known to show a variation in accuracy ranging from 10 to as high as 40 percent.

A preferred form of the present invention is a casing 20 of the order of one inch in diameter so that thinness in the coil is greatly to be desired.

Hygrometer coils are not suited to operate in recording soil moisture content. They are designed specifically for measuring atmospheric moisture, which presents an entirely different medium than soil. They do not remotely approach the sensitivity required to obtain a satisfactory soil moisture reading because of their heavier construction and their limited "travel" or "range."

A preferred form of the coil of this invention has a "travel" or "range" of approximately 600 degrees. It has been determined through hundreds of tests that this great range sensitivity, or a range of this order, is desirable to obtain a satisfactory reading of soil moisture content by means of the use of a laminated coil. Through its great travel range the present coil is found to be more than three times as sensitive as any known hygrometer coil.

There are other reasons why no existing hygrometer coil could satisfactorily register the moisture content of soil. For example:

The quantity of moisture in air depends upon the atmospheric pressure and the surrounding temperature. Thus, if air is at zero degrees Fahrenheit, with pressure at 30 inches sea level, the air is capable of holding approximately ½ grain of water vapor to the cubic foot. This increases to approximately 2 grains of moisture per cubic foot with a temperature reading of 32 degrees Fahrenheit to approximately 8 grains of moisture per cubic foot at 70 degrees Fahrenheit, and on up to about 20 grains of moisture per cubic foot at 100 degrees Fahrenheit—all at pressure sea level at 30 inches.

This same standard of measurement does not apply to the accurate approximation of moisture in a solid compact mass, such as soil. This is because soil, below its surface, is not affected in the same way as air with any gived temperature, irrespective of the degree of pressure at sea level. Also, soil, below its surface, will generally not have the same temperature as air, no matter what the pressure at sea level. Consequently, the moisture content of soil cannot be measured in the same way, or with the same devices, used in measuring atmospheric moisture content.

Zero humidity is practically unattainable unless artificially created by vacuum. Atmosphere will always retain a fair quantity of moisture, even under desert conditions. Likewise there is no such condition, normally, as zero moisture content in soil, unless such condition is artificially created by vacuum. Soil, like atmosphere, will always retain a fair quantity of moisture, even under desert conditions. Soil, generally, by comparison, will retain and hold much more moisture than air, probably due to its very porous structure. Soil moisture also has an elusive quality, since it is extremely difficult to define apparent content by "feel" of any given type of soil. For example, it has been found that average, medium soil, even when it contains as much as 50 percent moisture, is virtually dry to the touch. At a reading of about 40 percent moisture, average soil becomes very dry to the touch. A plant will still appear to be thriving when soil moisture is at a 50 percent reading. At a reading of approximately 40 percent, the plant, an average plant in the "moist" group, will quickly begin to show the effects of lack of moisture by starting to droop. At less than 40 percent soil moisture, or about 30 to 33⅓ percent, a plant will swiftly begin to wilt and die. (Again, this is an average plant from the "moist" group.) This is undoubtedly because the average plant in the "moist," and especially those in the "wet," group, are so largely composed of moisture. This is apparent when it is seen what is left of a leaf when it dries out completely. Moreover, plants in the "wet" group, that is those requiring great amounts of moisture, fare even worse under this condition and plant mortality rises proportionately. Plants in the "dry" group, such as cactus, would still thrive under this condition. Yet, probably 90 percent of all plants require considerable amounts of moisture. This all indicates that the average plant, in average soil, is in a safe moisture field, when moisture content does not fall below 50 percent. Therefore, it would be logical to use 50 percent moisture level as a minimum safety level for average plants.

With the coil of this invention, it is possible to calibrate it to provide this "minimum safety level" in soil moisture content. However, it is preferred not to use the 50 percent level but to go a step farther for even better plant protection by increasing this level to 60 percent minimum. Accordingly, the coil, calibrated or pre-set at a point to equal approximately 60 percent soil moisture content, is arranged to show on the dial as the starting point, namely, Zero Dry.

With the improved coil of this invention, there is also established a maximum safety level. Many plants, such as cactus, Chinese garden, hen and chickens, sedum, sempervivums, snake plant, etc., must be held in relatively dry soil. Such plants as ageratum, carnation, chrysanthemum, geranium, violet, prim rose, coleus and roses must be held in the moist zone. If any of these plants are consistently maintained in the extreme wet zone, this excessive wetness will literally choke such plants. It completely upsets the balance nature has established for them. It also creates root rot. Wherefore, the present coil is calibrated for maximum range of only 90 percent of soil moisture content. This allows a ten percent safety margin.

Thus, the coil of this invention is calibrated to cover only the limited range equal to 30 percent of the soil moisture field, that is, from sixty percent soil moisture content, which will show on the dial as Zero Dry, to 90 percent of soil moisture content, which will show on the dial as Maximum Wet.

Thus, the great "travel" or "range" becomes vitally advantageous in the coil of this invention. Such a "safety calibration" or setting would not be possible with any ordinary coil known today, or for that matter, with any other material used in hygroscopic registrations. The comparative result of this is as follows:

An ordinary hygrometer coil, operating over the generally used angular distance of 180° registers from zero to 100 percent humidity. This is a ratio of 1.0 percent humidity registered for every 1.8 degrees of travel.

The coil of the present invention, operating from a setting of 60 percent soil moisture level (Zero Dry) to 90 percent soil moisture level (Maximum Wet), is also arranged to cover an angular distance of 180°. However, the coil is actually recording over a field equal to only 30 percent of moisture content. This means that for every 6.0 degrees of travel, the present coil is registering 1.0% of moisture. Accordingly, the travel comparison is: Ordinary coil, 1.8 degrees per 1.0% of moisture registration; coil of this invention, 6.0 degrees per 1.0% of moisture registration.

Or the comparison may be made in the following way:

ORDINARY COIL TRAVEL

Zero to 100% humidity registration equals 180 degrees' travel
Zero to 50% humidity registration equals 90 degrees' travel
Zero to 25% humidity registration equals 45 degrees' travel
Zero to 10% humidity registration equals 18 degrees' travel
Zero to 5% humidity registration equals 9 degrees' travel
Zero to 1% humidity registration equals 1.8 degrees' travel

INVENTION COIL TRAVEL

[If permitted to travel its full range]

Zero to 100% moisture registration equals 600 degrees' travel
Zero to 50% moisture registration equals 300 degrees' travel
Zero to 25% moisture registration equals 150 degrees' travel
Zero to 10% moisture registration equals 60 degrees' travel
Zero to 5% moisture registration equals 30 degrees' travel
Zero to 1% moisture registration equals 6 degrees' travel An example in materials, proportions and method of production of a preferred form of hygroscopic coil is as follows:

(a) Materials

Phosphor bronze, half hard, 1/1000 in. thickness.
Paper, 5/1000 substance 70, regular finish "Mead Moistrite Offset."
Adhesive, wax carton type, resin base, known as "G.R.C. 33," made by Arabol Manufacturing Co., 110 E. 42nd St., New York City.

(b) Lamination

The Phosphor bronze sheet is coated with a 1 to 2/1000 covering of the adhesive. This is permitted to "set" for about 60 seconds. The paper is applied. A roller is then used over the lamination to press out excessive adhesive and to even the application. The laminated sheet is then placed under pressure of approximately 10 pounds per square inch and allowed to dry for 16 hours.

(c) Coil preparation

The laminated sheet is then cut into strips 1/8 inch wide and 8 inches long. In regular production, these 1/8 inch strips could be cut into much longer lengths—6, 8, 10 or 12 feet—then fed into an automatic coiling unit which would, of course, trim them to proper length of 8 inches each.

The 8 inch lamination is then set into a slit mandrel for coiling. This slit mandrel has a diameter of .068 and a slit width of .008. The mandrel is then turned at a speed of 76 r.p.m.'s. There is a roller applied against the lamination as it is turning, with a pressure of 10 pounds.

The mandrel is given 50 complete revolutions after the laminated strip is completely coiled on the turning mandrel.

When the coil is removed from the mandrel it will be 7½ turns, or coils, or circles, by 9/16 inch in diameter, maximum.

(d) Curing and cycling the coil

The coil is then placed in an oven with a temperature of 375 degrees Fahrenheit to cure it, or cycle it—to make it take a permanent set. It is allowed to remain in the oven for not more than 45 minutes, at this temperature. At 45 minutes, the heat is turned off and the oven door opened. The coil is then allowed to cool in the oven, until the latter has reached room temperature.

The coil will then show: 6½ turns, and be 5/8 of an inch in diameter. It is now completely cured, or cycled, and ready for use.

The method of setting or calibrating the improved coil is as follows:

(a) First the operating mechanism is assembled. The pivot bearing or spindle 33 is inserted into the center of the dial base 34. The coil is then fastened to the pivot bearing and the slot on the outer edge of the dial base. The indicator hand is pressed into place on the pivot bearing.

(b) The assembled operating mechanisms are then placed on small trays.

(c) The small trays are then placed in cabinets, which are controlled to give a constant reading equal to 60% soil moisture content, to achieve the required setting.

(d) The assembled coil mechanisms are left in the moisture cabinets for a period of 24 hours to allow ample time for them to "level off" at the required 60% soil moisture level.

(e) They are then removed and taken to the assembly tables. Here the hand 36 is held firmly at the level at which it has stopped—equal to 60% soil moisture content—and the dial face 35 is turned to meet the position of the hand until the dial reading of Zero Dry is even with the hand. It is left there and the setting, or calibration, is then complete. The remainder of the assembly may proceed.

When the transparent cover 49 is put in place as appears in Figure 4, the stop lug or pin 51 will engage just below the hand or pointer 36 in the Zero Dry position and the opposing stop lug or pin 52 will be at the point 48 of the dial to intercept the hand or pointer 36 in its travel about the scale 43. The stop lugs 51 and 52 restrict the rotation of the spindle 33 and the hand or pointer 36 to a half circular or 180° angular travel.

The working mechanism is easily accessible by pulling off the transparent cover 49 whereupon the coil unit may be removed as indicated in Figure 5.

In "setting" or "calibrating," before the scale dial is affixed to the support dial 34, the scale dial 35 is turned clockwise to meet the hand or pointer 36. The paper or scale dial 35 is turned in this clockwise direction until Zero Dry point 47 meets the hand or pointer at 36. This occurs after the removal of the coil from the moisture cabinet, with the coil then registering the equivalent of 60 percent soil moisture content. This means that the coil has already travelled 360 degrees. The dial 35 is now affixed to the support dial 34 and the coil unit is put in place in the casing 20, 21 with the diametric line 41 substantially horizontal in the upright position of the instrument. While the coil has approximately 240 degrees of travel left, it is permitted to travel only an additional 180 degrees from Zero Dry to Maximum Wet. The remaining 60 degrees of travel, representing the ten percent "maximum safety level" above referred to, is halted by the stop lug or pin 52 at Maximum Wet. Thus, the calibration of the coil, the setting of the dial and the arrangement of the stops 51, 52 is important in relative relationship to provide an instrument of high sensitivity having the travel and range factors hereinabove set out and tabulated.

Figure 10 illustrates how the instrument is to be mounted and placed in actual use. The tapered portion 26 of the stem is to facilitate penetration of the stem into the earth. The stem is inserted until all of the perforations 25 are below surface level in which case the coil chamber 22 in the casing 20, 21 is completely isolated from moisture conditions in the ambient atmosphere. The instrument can then be affected only by moisture conditions in the sub-soil. This moisture enters through the perforations 25 and has access to the coil which elongates and contracts proportionately to wet and dry conditions of the sub-soil. The aperture 27 in the lower end of the stem allows water to trickle through so it is not held in the casing.

The screen 29 prevents fine soil from sifting into the coil operating area.

It will appear from the foregoing that the unitary character of the hygroscopic unit is important in that before assemblage of the parts of this unit together and before the mounting of the unit in the casing 20, 21, the process steps as above outlined are conveniently carried out in the setting and calibrating of the coil 32 so that its condition when completed is one of bias to a preselected figure, for instance, of 60 percent soil moisture indication. It is to be understood that this figure of 60 percent and other figures employed throughout this specification are exemplary only. It is believed that the predetermined Zero Dry point of 60 percent is possibly ideal as is also the figure of 90 percent for the final Maximum Wet position of the index 31 and the hygroscopic coil 32 with which it is entrained. It is suggested, for instance, that a range of from 50 to 65 percent soil moisture content might be employed, any degree within which would be workable. However, as above stated, the figure of 60 percent is probably the ideal soil-moisture content taken as a reference point for the Zero Dry position of the indicator.

It is to be understood also that this maximum safety level figure of 90 percent soil moisture content employed throughout this specification is exemplary only, since a range of 90–95 percent, or thereabouts, might be employed as entirely workable. However, once again, the figure of 90 percent maximum soil moisture content is probably the ideal taken as a reference point for the Maximum Wet position of the indicator.

After assembling the dial 35 to the support disc 34, and after affixing the index 36 on the end of the spindle or arbor 33 outside the dial 35, the dial 35 is in an initial loose position on the spindle 33, that is, it may be rotated relatively to the spindle 33 and the index 36 for the purpose, as before stated, of bringing the dial 35 to a position where the initial or origin dry point 47 will come into concurrence with the index 36. The dial 35 may be then temporarily affixed to the support disc 34. In almost all cases this setting of the dial 35 will cause a shifting of the scale 43 and of its sub-divisions 44, 45 and 46 to an angular or tilted position in which the diametric line 41 does not coincide with the horizon. This is, however of small moment because the shoulder 31 and the lip 30 of the casing 20, 21 permit the hygroscopic unit as a whole to be bodily rotated in the casing, thus allowing of an adjustment of the dial to a properly oriented position in which its diametric line 41 corresponds with the horizontal and therefore the dial scale is erected for proper convenient reading when the instrument is in the position of use shown in Figure 10.

Thus, there is a direct relationship between the relative angular movement of the dial 35 in relation to the index 36 and the support disc 34 and the provision by which the mounting of the hygroscopic unit in the casing is such as to admit of its rotational or angular adjustment. Moreover, flange 50 and transparent cover 49 by which the hygroscopic unit is fixed and retained in the casing 20, 21 are such that the cover can be applied to the hygroscopic unit in any rotational position of the same and just as effectively bind this unit in a sealed condition against the shoulder 31 and also bind the same against casual or accidental angular creeping around upon the shoulder 31 which would disturb the proper orientation of the dial 35 and its scales.

It will also be noted that there is a direct relationship between a hygroscopic coil 32 treated and calibrated as above described and the limit stops 51 and 52 which, acting in accompaniment with the index 36, will prevent such index from going below the origin dry point 47 at one side of the scale and also from going above the maximum wet point 48 at the opposite end of the scale, thus confining the travel of the index 36 and of the corresponding expanding movement of the volute coil 32 to a range of 180 degrees while registering in this range a moisture percentage range of only 30 degrees. This all makes for an extremely sensitive instrument.

Although I have disclosed herein the best form of the invention known to me at this time, I reserve the right to all such modifications and changes as may come within the scope of the following claims.

What is claimed is:

1. In a plant moisture meter, a casing having an annular shoulder at an open end thereof, a support fitted to rotate on said shoulder, a hygroscopic coil having one end affixed to said support, a spindle journaled through said support and extending on the inner side thereof into said casing and on the outer side also of said support and affixed at its inner end portion to the other end of said coil, and rotatable incident to expansion and contraction of said coil, a pointer affixed to the outer end portion of said spindle, a rotary dial rotatably mounted with respect to said spindle and support and placed between said pointer and support, and a transparent cover having a part fitted to said casing and rotatable thereabout for binding the support and dial against said shoulder and incidentally for binding the dial non-rotatively against the support.

2. A plant moisture meter comprising a casing having an open end with a lip thereabout and a shoulder inwardly of said lip, a support rotatably mounted upon said shoulder within said lip, a hygroscopic coil affixed at its outer end portion to said support on the inside of the casing, a spindle rotatably journaled in said support projecting inwardly of said casing and affixed to the inner end of said coil with a part of the spindle extending forwardly of said support, a dial rotatable relatively to said spindle and support and positioned in front of said support, a pointer affixed to the spindle outwardly of the dial, a transparent cover fitted rotatably and frictionally to said lip against the outer edge portion of said dial to hold the support and dial against rotation in the casing, and limit stops free of the dial projecting inwardly from said cover in the path of said pointer.

3. A plant moisture meter comprising a casing having an open end with an annular shoulder thereon, a hygroscopic unit removably mounted in said casing and comprising a hygroscopic coil, a spindle affixed to the inner end of said coil, a pointer affixed to the outer end of said coil, a support rotatable about said spindle and having a part for affixing the outer end of the coil thereto, and a dial rotatably mounted in front of said support and about said spindle, said support adapted to be rotatably fitted to the open end of said casing with the coil located in said casing, and a transparent cover member rotatably and frictionally fitted to said casing in front of the support and dial to hold the unit in angularly adjusted position in the casing, and stops free of the dial angularly displaced from one another and projecting from the inner portion of the cover into the path only of said pointer.

4. In a plant moisture meter, a casing having an open end, a hygroscopic unit fitted removably and rotatably in said open end of the casing and comprising a hygroscopic coil, a spindle affixed to an inner end portion of the coil, a support disc through which the spindle is rotatably journaled, said disc having a part affixed to the outer end of said coil, a pointer on the outer end portion of said spindle in front of said disc, a dial having a scale and reference line rotatably mounted relatively to said support disc and spindle and between the pointer and support disc to orient the reference line with respect to the angularly adjusted pointer position, a transparent cover having a part to engage the marginal portion of the dial, means between the cover and open end of the casing to rotatively and bindingly receive the cover in such open end with said part forcibly engaging the dial to bind the dial into non-rotative engagement with the disc to preserve adjusted orientation, and stops projecting inwardly from the cover and spaced at distances agreeing substantially with the opposite end portions of the reference line, said stops angularly adjustable with the rotation of the cover to bring the stops into registry with the reference line after the dial has been adjusted.

References Cited in the file of this patent

UNITED STATES PATENTS

| Number | Name | Date |
| --- | --- | --- |
| 447,726 | Hagstrom | Mar. 3, 1891 |
| 1,984,233 | Reed | Dec. 11, 1934 |
| 2,044,239 | Bullock | June 16, 1936 |
| 2,046,480 | Pearson | July 7, 1936 |
| 2,093,767 | Rollefson | Sept. 21, 1937 |
| 2,099,958 | Herold | Nov. 23, 1937 |
| 2,105,683 | Burdick | Jan. 18, 1938 |
| 2,131,554 | De Rayville | Sept. 27, 1938 |
| 2,723,557 | Oklheiser | Nov. 15, 1955 |